(12) United States Patent
Takahashi

(10) Patent No.: US 9,087,268 B2
(45) Date of Patent: *Jul. 21, 2015

(54) EXTRACTING FEATURE QUANTITIES FROM AN IMAGE TO PERFORM LOCATION ESTIMATION

(71) Applicant: International Business Machines Corporation, Armonk, NY (US)

(72) Inventor: Toshihiro Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/965,439

(22) Filed: Aug. 13, 2013

(65) Prior Publication Data
US 2014/0050353 A1    Feb. 20, 2014

(30) Foreign Application Priority Data

Aug. 15, 2012 (JP) .................................. 2012-179994

(51) Int. Cl.
G06K 9/46 (2006.01)
G06K 9/22 (2006.01)
G06T 7/00 (2006.01)

(52) U.S. Cl.
CPC .............. *G06K 9/4671* (2013.01); *G06K 9/228* (2013.01); *G06T 7/0042* (2013.01); *G06T 7/0071* (2013.01)

(58) Field of Classification Search
USPC ......... 382/100, 103, 104, 106, 107, 120, 121, 382/181, 190, 195, 202, 203; 348/135, 143; 73/1.37, 1.38, 1.77, 488, 503.3, 504.8, 73/504.18; 701/70
See application file for complete search history.

(56) References Cited

U.S. PATENT DOCUMENTS 6,091,833 A * 7/2000 Yasui et al. .................... 382/104
7,961,909 B2 * 6/2011 Mandella et al. ............. 382/103
(Continued)

FOREIGN PATENT DOCUMENTS

JP         1040385 A      2/1998
JP      2004294421 A     10/2004
(Continued)

OTHER PUBLICATIONS

PCT International Search Report and Written Opinion, International Application No. PCT/JP2013/066316; International Filing Date: Jun. 13, 2013; Date of Mailing: Sep. 3, 2013; pp. 1-7.

(Continued)

*Primary Examiner* — Anand Bhatnagar
(74) *Attorney, Agent, or Firm* — Cantor Colburn LLP; Gail Zarick

(57) ABSTRACT

A feature extraction method for extracting a feature from an image includes receiving an image and measured acceleration data from a mobile device; obtaining a gravity vector in the image in a camera coordinate system based on the measured acceleration data; obtaining a vanishing point in the image in a vertical direction in a screen coordinate system using the gravity vector; obtaining differential vectors along two axes for each pixel in the screen coordinate system; obtaining a connection line vector connecting each of the pixels with the vanishing point; identifying a vertical edge based on determining that an angle formed by the differential vector and the connection line vector is within a certain threshold range; obtaining the sum of strengths of vertical edges and writing the sum in a predetermined variable array; extracting a keypoint based on the variable array; and calculating a feature quantity from the keypoint.

14 Claims, 10 Drawing Sheets

(56) References Cited

U.S. PATENT DOCUMENTS

| | | | |
|---|---|---|---|
| 8,212,878 B2 * | 7/2012 | Shima et al. | 348/207.99 |
| 8,411,900 B2 * | 4/2013 | Naka et al. | 382/103 |
| 2005/0232467 A1 * | 10/2005 | Mohri et al. | 382/103 |
| 2006/0078214 A1 * | 4/2006 | Gallagher | 382/254 |
| 2007/0002015 A1 * | 1/2007 | Mohri et al. | 345/157 |
| 2010/0208057 A1 * | 8/2010 | Meier et al. | 348/135 |
| 2012/0026322 A1 * | 2/2012 | Malka et al. | 348/142 |
| 2012/0033083 A1 * | 2/2012 | Horbinger et al. | 348/159 |

FOREIGN PATENT DOCUMENTS

| | | |
|---|---|---|
| JP | 2008046750 A | 2/2008 |
| JP | 2009140149 A | 6/2009 |
| JP | 2009237845 A | 10/2009 |
| JP | 2009237847 A | 10/2009 |
| JP | 2010067090 A | 3/2010 |
| JP | 2011053181 A | 3/2011 |
| JP | 2011113197 A | 6/2011 |
| JP | 2012127896 A | 7/2012 |
| JP | 2012151653 A | 8/2012 |
| WO | 2008087974 A1 | 7/2008 |

OTHER PUBLICATIONS

Akihiko Torri, et al., "Recent Research Trends in Multi-View Three-Dimensional Reconstruction," IPSJ ISG Technical Report, vol. 2011-CVM 176—No. 1, Apr. 15, 2011, With English Abstract, pp. 1-27.

Hironobu Fujiyoshi, "Gradient-Based Feature Extraction: SIFT and HOG", Information Processing Society of Japan Technical Report, CVIM [Computer Vision and Image Media], 2007, (87), pp. 211-224, Sep. 3, 2007, with English Abstract.

* cited by examiner

EXTRACTING FEATURE QUANTITIES FROM AN IMAGE TO PERFORM LOCATION ESTIMATION

PRIORITY

This application claims priority to Japanese Patent Application No. 2012-179994, filed Aug. 15, 2012, and all the benefits accruing therefrom under 35 U.S.C. §119, the contents of which in its entirety are herein incorporated by reference.

BACKGROUND

The present invention relates to a technique to extract feature quantities from an image to perform location estimation.

There is an increasing demand for techniques to estimate in-door locations for analyzing customer traffic lines in places such as shopping centers and public facilities and for inventory control in these years.

It is difficult to accurately estimate a location indoors because a wireless device such as a WiFi or RFID device when used indoors generates much noise. GPS provides a relatively accurate location estimation but cannot be used indoors. Therefore a technique has been developed in which a camera is attached to a moving object to shot an image and the shot image is analyzed to predict the location.

Existing techniques related to this include techniques disclosed in WO2008/087974. WO2008/087974 relates to a technique to calculate positional relationship between multiple cameras and a technique to generate a user interface based on the calculated positional relationship and discloses calculation of the positions of multiple cameras based on a shot image without using GPS.

Hironobu Fujiyoshi, "Gradient-Based Feature Extraction: SIFT and HOG", Information Processing Society of Japan Technical Report, CVIM [Computer Vision and Image Media], 2007, (87), 211-224, 2007-09-03 provides a summary of the SIFT algorithm and describes detection of extrema in a DoG image and HOG.

JP2011-53181A discloses orientation estimation using SIFT (Scale-Invariant Feature Transform) feature quantities in order to provide a reliable information terminal apparatus capable of estimating the orientation of a user and controlling display information on a display according to the result of the estimation without needing incorporation of a geomagnetic sensor.

SIFT is one of image feature extraction techniques and relates to detection of feature points and a method for calculating feature vectors around a feature point. Aside from this, Structure from Motion (SfM), which is a technique to reconstruct a three-dimensional positional relationship between singularity points and camera positions from an image is known. SfM is described in JP10-40385A, JP2009-237845A and JP2009-237847A, for example.

SfM is a technique in which feature points are extracted from an image, such as corners, and the intensities of 8×8 pixels around a feature point are arranged to simply generate a 64-bit feature vector or otherwise to calculate feature vectors from pixels around the feature point and matching is performed between a plurality of pixels. In this way, the three-dimensional position of the feature point and the position of the camera can be reconstructed at the same time.

To stably obtain SfM, a feature quantity calculation method that is robust to noise, that is, robust to fluctuations in an image, and robust to rotation and scaling of the image is required. However, the conventional methods have the problem of high calculation costs. To obtain SfM, generally an amount of calculation proportional to the number of pixels is required and therefore considerations to the calculation cost are essential.

SUMMARY

In one embodiment, a feature extraction method for extracting a feature from an image by computer processing includes receiving an image and measured acceleration data from a mobile device including image acquiring means and acceleration measuring means; obtaining a gravity vector in the image in a camera coordinate system on a basis of the measured acceleration data; obtaining a vanishing point in the image in a vertical direction in a screen coordinate system by using the gravity vector; obtaining differential vectors along two axes for each of pixels in the screen coordinate system; obtaining a connection line vector connecting each of the pixels with the vanishing point; identifying a vertical edge on the basis of determination that an angle formed by the differential vector and the connection line vector is within a certain threshold range; obtaining the sum of strengths of vertical edges and writing the sum in a predetermined variable array; extracting a keypoint on the basis of the variable array; and calculating a feature quantity from the keypoint.

In another embodiment, a feature extraction program product for extracting a feature from an image by computer processing is disclosed, the program product causing a computer to perform: receiving an image and measured acceleration data from a mobile device including image acquiring means and acceleration measuring means; obtaining a gravity vector in the image in a camera coordinate system on the basis of the measured acceleration data; obtaining a vanishing point in the image in a vertical direction in a screen coordinate system by using the gravity vector; obtaining differential vectors along two axes for each of pixels in the screen coordinate system; obtaining a connection line vector connecting each of the pixels with the vanishing point; identifying a vertical edge on the basis of determination that an angle formed by the differential vector and the connection line vector is within a certain threshold range; obtaining the sum of strengths of vertical edges and writing the sum in a predetermined variable array; extracting a keypoint on the basis of the variable array; and calculating a feature quantity from the keypoint.

In another embodiment, a feature extraction system for extracting a feature from an image by computer processing includes means for receiving an image and measured acceleration data from a mobile device including image acquiring means and acceleration measuring means; means for obtaining a gravity vector in the image in a camera coordinate system on the basis of the measured acceleration data; means for obtaining a vanishing point in the image in a vertical direction in a screen coordinate system by using the gravity vector; means for obtaining differential vectors along two axes for each of pixels in the screen coordinate system; means for obtaining a connection line vector connecting each of the pixels with the vanishing point; means for identifying a vertical edge on the basis of determination that an angle formed by the differential vector and the connection line vector is within a certain threshold range; means for obtaining the sum of strengths of vertical edges and writing the sum in a predetermined variable array; means for extracting a keypoint on the basis of the variable array; and means for calculating a feature quantity from the keypoint.

DETAILED DESCRIPTION

Figure 1:
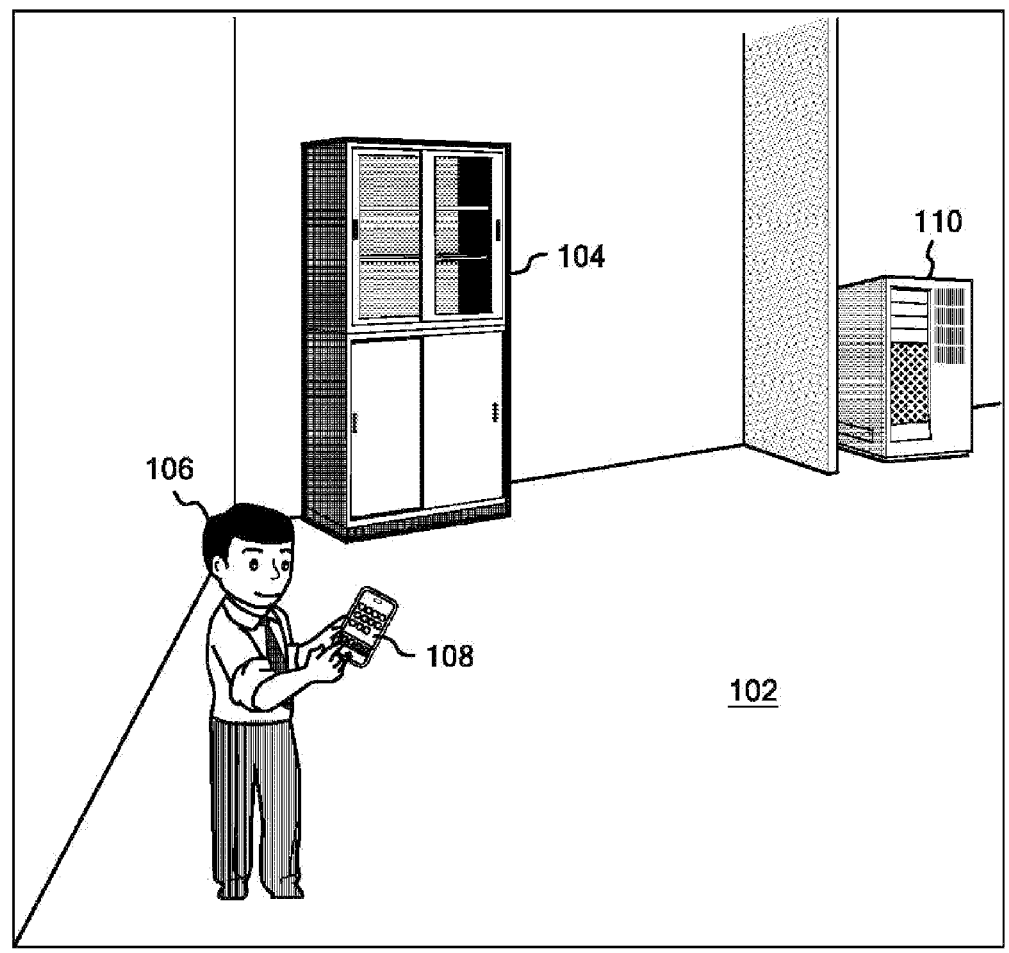
FIG. 1 is a diagram illustrating acquisition of acceleration data and image data using a smartphone and transmission of the data to the computer for processing in a room.

In view of the above, it is desirable to provide a technique to obtain SfM fast and robustly. Embodiments of the present invention solve the problem by taking advantage of the fact that many features used in SfM are lines parallel to the direction of gravity, and that mobile devices such as smartphones include an acceleration sensor or a gyroscope.

According to embodiments the present invention, a computer system acting as a server receives an image and results of measurements with an acceleration sensor from a smartphone through a communication function.

The computer system first extracts only vertical edges from the image. For that purpose, the computer system uses the acceleration sensor to obtain a gravity vector in a camera coordinate system. The system then uses the gravity vector to obtain a vanishing point (u', v') in the vertical direction in a screen coordinate system.

The computer system then calculates differential vectors in u and v directions of intensity of each pixel (u, v) in the screen coordinate system. The computer system obtains a cos component formed by each difference vector and (U'-u, v'-v), normalizes the two vectors with a length of 1, then calculates the inner product of the vectors. If the absolute value of cos is greater than or equal to a certain threshold, the computer system determines that the pixel has a vertical edge.

The computer system then obtains the sum of edge strengths in the vertical direction for a set of edges located along the vertical direction. Specifically, the computer system transforms the screen coordinates (u, v) to camera coordinates, projects the two axes of screen coordinates (u, v) to one axis. The computer system calculates the absolute value of a differential vector at (u, v) and writes the absolute value in a table sum[q].

Once having provided sum[q], the computer system assume sum[q] to be a horizontally long image of w×1 and calculates extrema by using a DoG (difference of Gaussian) function. The computer system uses the extrema to calculate feature quantities.

According to embodiments of the present invention, edges along the vertical direction are detected from an image and results of measurements with an acceleration sensor received from a mobile device and the edges are used to extract features, therefore fast position estimation can be performed with a less amount of calculation. An exemplary embodiment of the present invention will be described with reference to drawings. Throughout the drawings, like reference numerals denote like items unless otherwise specified. It should be noted that the following is a description of one embodiment of the present invention and is not intended to limit the present invention to what is described with the exemplary embodiment.

FIG. 1 is a diagram schematically illustrating a general configuration of an example for carrying out the present invention. In FIG. 1, locational feature objects such as a cabinet 104 are placed in a room 102.

An operator 106 takes an image of an interior scene of the room 102 with a smartphone 108 including an acceleration sensor and the function of camera and transmits the taken image data and measurement data of the acceleration sensor to a computer placed in the room through wireless communication.

The computer 110 receives the transmitted image data and measurement data of the acceleration sensor, extracts features by using the data, and performs a process for estimating the location. The computer 110 may be placed in a remote site, provided that the computer 110 has a configuration capable of receiving measurement data of the acceleration sensor and image data from the smartphone 108. In that case, information is transferred to the computer 110 placed in the remote site through a receiving station such as a WiFi station. Alternatively, a process for extracting features, which will be described later, may be performed inside the smartphone 108 since smartphones these days are powerful. For convenience of explanation, it is assumed in the following description of the exemplary embodiment that feature extraction and location estimation processes are performed on a computer 110 separate from the smartphone 108.

Figure 2:
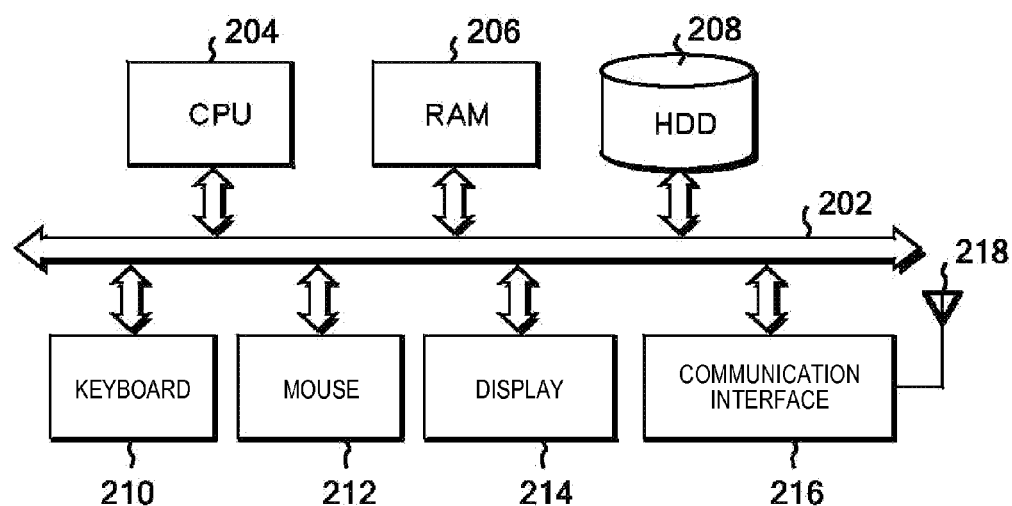
FIG. 2 is a block diagram illustrating an example of hardware of a computer used with embodiments of the present invention.

FIG. 2 is a block diagram illustrating a hardware configuration of the computer 110. In FIG. 2, a CPU 204, a main memory (RAM) 206, a hard disk drive (HDD) 208, a keyboard 210, a mouse 212, and a display 214 are connected to a system bus 202. Preferably, the CPU 204 is based on a 32-bit or 64-bit architecture and may be Core™ i7 or Core™ i5 from Intel Corporation or AMD Athlon™ II, for example. The main memory 206 preferably has a capacity of 4 GB or more.

A communication interface 216 is also connected to the system bus 202. The communication interface 216 is capable of communicating with the smartphone 108 through an antenna 218 according to a standard, for example IEEE 802.11a/b/g. Note that the method for the computer 110 to receive data from the smartphone 108 is not limited to IEEE 802.11a/b/g; any method may be used such as packet communication.

An operating system is stored in the hard disk drive 208. The operating system may be any operating system that is compatible with the CPU 204, such as Linux™, Windows 7™ or Windows XP™ from Microsoft Corporation, or Mac OSC™ from Apple Computer, Inc.

Further stored in the hard disk drive 208 are a main program 302, a sum calculation routine 306, a DoG calculation and extrema detection routine 308 and feature quantity calculation routine 310, which will be described later with respect to FIG. 3. These can be written in any of the existing programing languages such as C, C++ and Java (R).

Figure 3:
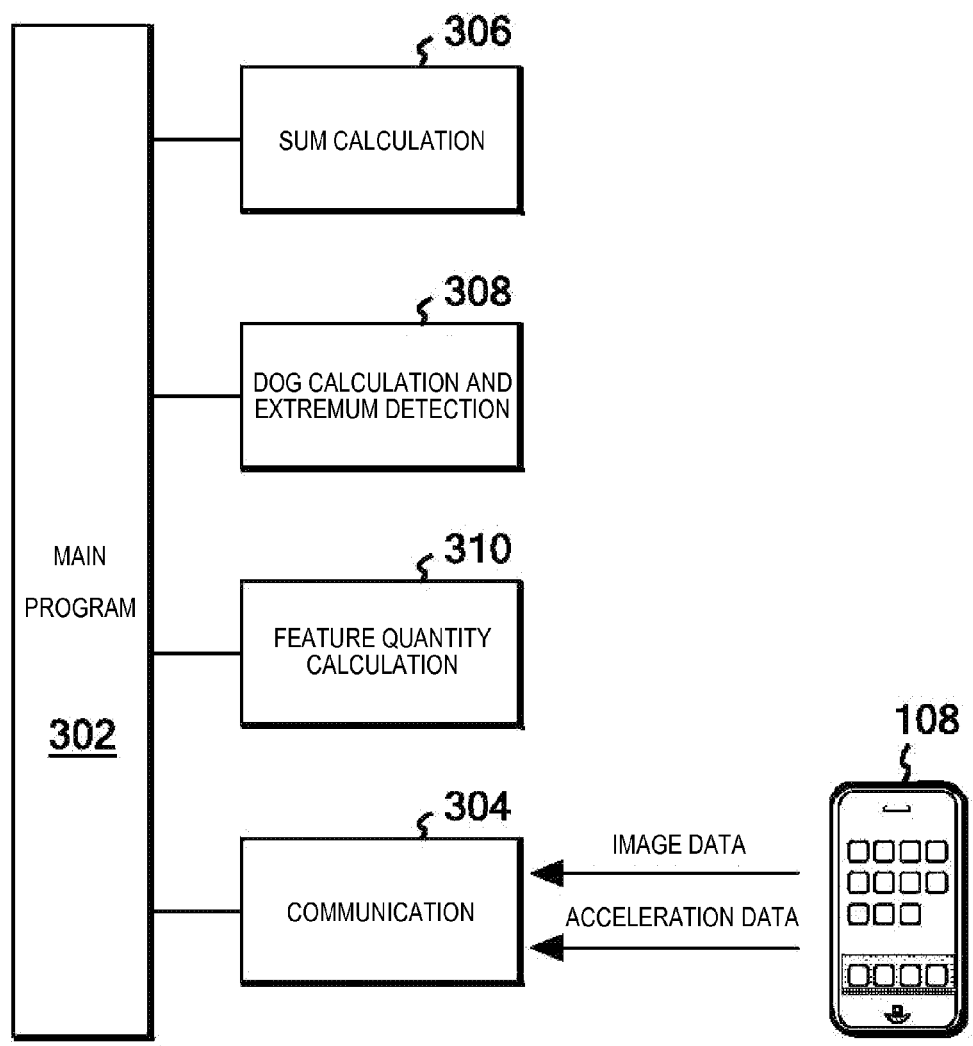
FIG. 3 is a functional block diagram of a process according to the present invention.

FIG. 3 is a block diagram of a software configuration of a part of the computer 110 that executes functions relating to embodiments of the present invention.

In FIG. 3, the main program 302 is activated in response to an operation of the keyboard 210 or the mouse 212, receives image data and measurement data of the acceleration sensor from the smartphone 108 through a mechanism such as WiFi by the function of the communication module 304, and stores the data preferably in the hard disk drive 208.

The main program 302 activates the sum calculation routine 306, the DoG calculation and extrema detection routine 308 and the feature quantity calculation routine 310 to initiate feature extraction based on the image data and measurement data of the acceleration sensor transmitted from the smartphone 108 according to embodiments of the present invention.

More specifically, the sum calculation routine 306 performs a process for calculating sum, which is a one-dimensional array, from the image data and measurement data of the acceleration sensor transmitted from the smartphone 180. The process of the sum calculation routine 306 will be described later in detail with reference to a flowchart in FIG. 4.

The DoG calculation and extrema detection routine 308 uses a value of sum calculated by the sum calculation routine 306 to perform a process for calculating DoG (Difference of Gaussian) and detecting extrema. The process of the DoG calculation and extrema detection routine 308 will be described later in detail with reference to a flowchart in FIG. 5.

The feature quantity calculation routine 310 performs a process for calculating feature quantities on the basis of extrema (keypoints) detected by the DoG calculation and extrema detection routine 308. The process of the feature quantity calculation routine 310 will be described later in detail with reference to a flowchart in FIG. 6.

Figure 4:
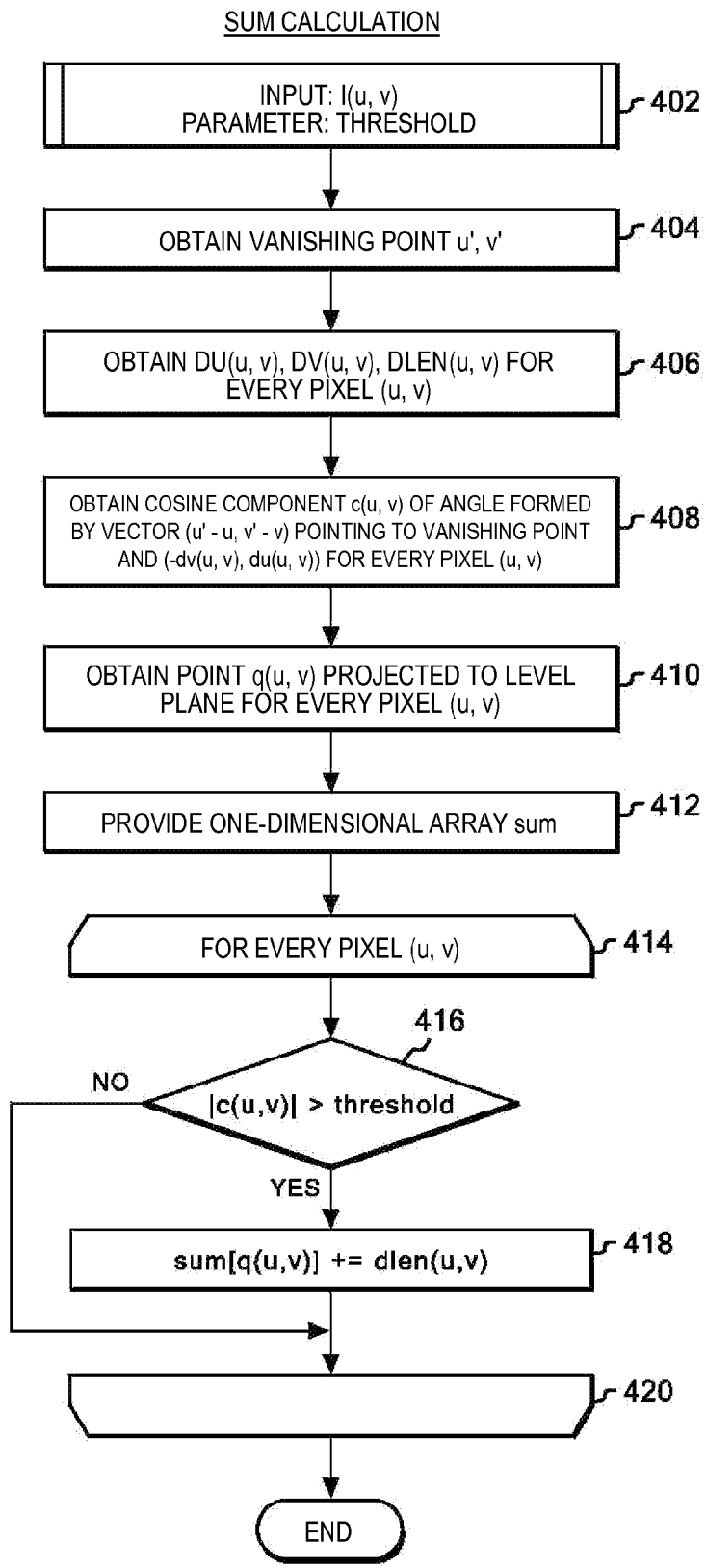
FIG. 4 is a flowchart of a process for computing sum.

The process of the sum calculation routine 306 will be described below with reference to the flowchart of FIG. 4. As illustrated at block 402, the sum calculation routine 306 is invoked by the main program 302 with the intensities I (u, v) of an image and a threshold value as arguments. Here, each of the intensities I (u, v) of the image is the intensity of a pixel at pixel coordinates (x, y)=(u, v). The threshold value is set at 0.95 in one exemplary embodiment.

The sum calculation routine 306 obtains a vanishing point u', v' at block 404. Specifically, the sum calculation routine 306 calculates a vanishing point u', v' according to the following formula:

$$u' = f * x_g/z_g + w/2$$

$$v' = -f * y_g/z_g + h/2$$

where w is the width of the image, h is the height of the image, f is the focal length, and $V_g = (x_g, y_g, z_g)$ is the vector of an acceleration value representing the direction of gravity received from the smartphone 108.

At block 406, the sum calculation routine 306 obtains du(u, v), dv(u, v), and dlen(u, v) for every pixel (u, v) according to the following formula:

$$du(u, v) = \frac{dI(u, v)}{du} = \frac{I(u+1, v) - I(u-1, v)}{2}$$

$$dv(u, v) = \frac{dI(u, v)}{dv} = \frac{I(u, v+1) - I(u, v-1)}{2}$$

Formula 1

-continued
$$dlen(u, v) = \sqrt{du(u, v)^2 + dv(u, v)^2}$$

Here, du(u, v) is a differential at (u, v) in the u direction and dv(u, v) is a differential at (u, v) in the v direction.

While each of the differentials calculated here is the average of a forward difference and a backward difference, any method for calculating differentials may be used as appropriate. For example, only a forward difference or only a backward difference may be calculated.

At block 408, the sum calculation routine 306 then obtains a cosine component c(u, v) of the angle formed by a vector (u'-u, v'-v) pointing to the vanishing point and (-dv(u, v), du(u, v)) for every pixel (u, v) according to the following formula:

$$c(u, v) = \frac{-(u'-u)dv(u, v) + (v'-v)du(u, v)}{\sqrt{(u'-u)^2 + (v'-v)^2} \sqrt{du(u, v)^2 + dv(u, v)^2}}$$

Formula 2

Figure 7:
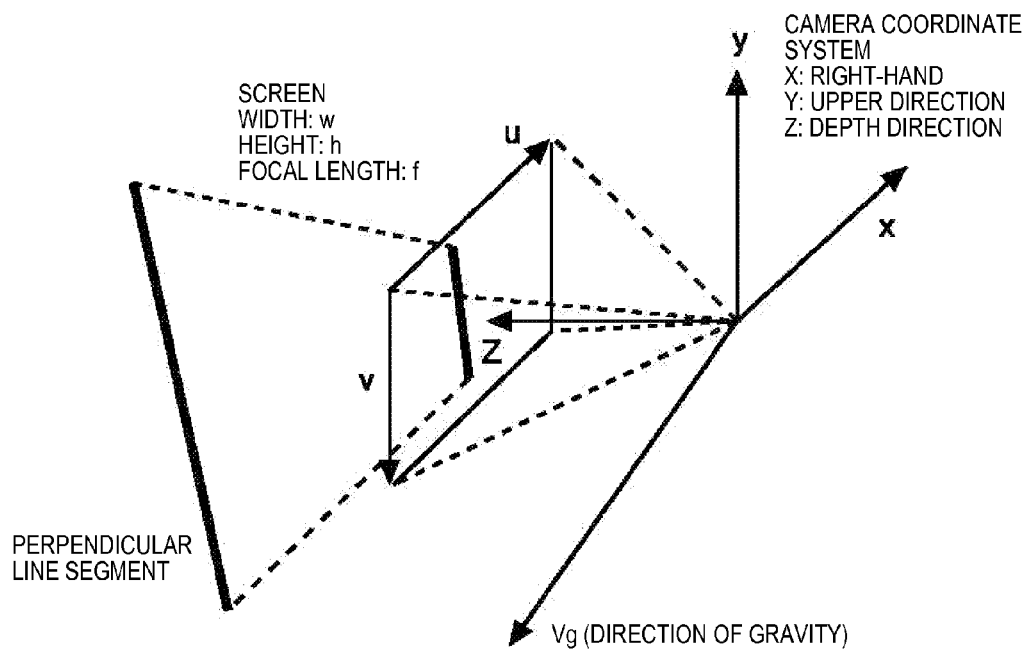
FIG. 7 is a diagram illustrating a relationship among a camera coordinate system, a screen and the direction of gravity.
Figure 8:
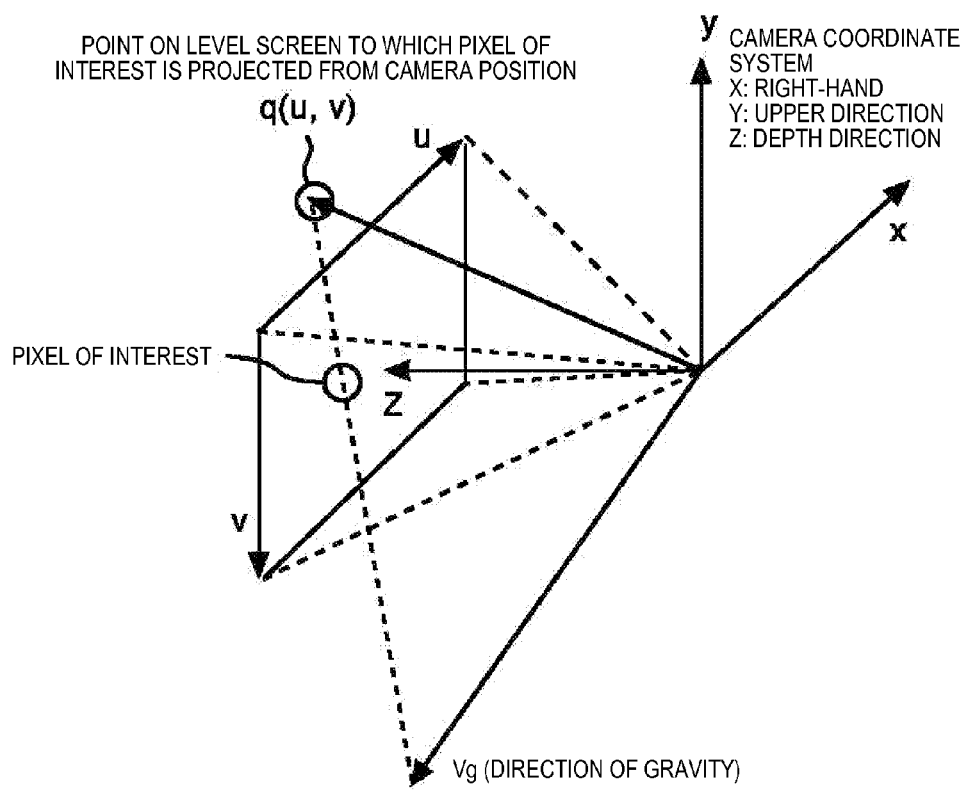
FIG. 8 is a diagram illustrating a method for projecting coordinates of two axes of a pixel to one axis orthogonal to the direction of gravity.
Figure 9:
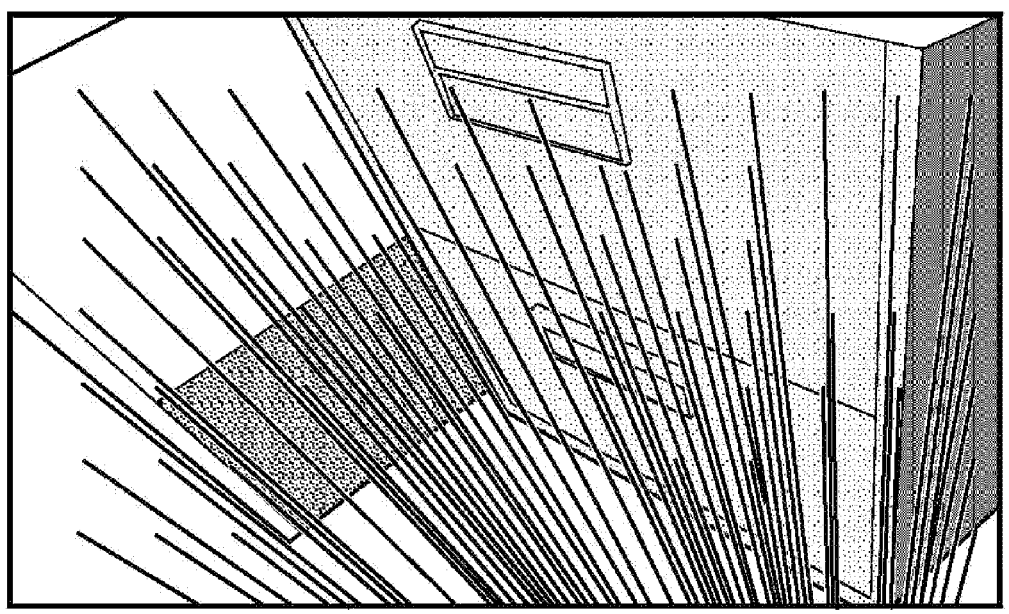
FIG. 9 is a diagram illustrating projection of lines that link pixels with a vanishing point and are perpendicular to a ground surface onto a screen.

The sum calculation routine 306 then obtains a point q(u, v) projected onto a level plane at block 410. More specifically, the sum calculation routine 306 first transforms the screen coordinates of a point to camera coordinates of the point according to V=(x, y, 1)=((u−w/2)/f, −(v−h/2)/f, 1). FIG. 7 is a diagram schematically illustrating relationship among the camera coordinate system, the screen and the direction of gravity. The sum calculation routine 306 then obtains a position at which a line passing through the Vh=(xh, yh, 1)=V−Vg*<V, Vg>/<Vg, Vg> and (xg/zg, yg/zg, 1) orthogonally intersects Vg on the screen (z=1) and rounds down the x coordinate xh of Vh to the nearest whole number to obtain a value as q(u, v). That is, q(u, v)=(int) xh. Here, <V, Vg> represents the inner product of the vectors V and Vg. FIG. 8 schematically illustrates the projection to obtain q(u, v).

The sum calculation routine 306 then provides a one-dimensional array, sum, at block 412.

The sum calculation routine 306 then performs a process from block 414 through 420 for every pixel (u, v). Specifically, the sum calculation routine 306 determines whether or not |c(u, v)|>threshold for a given pixel (u, v) and, if so, adds the value of dlen(u, v) by sum[q(u, v)]+=dlen(u, v). In this exemplary embodiment, the threshold is set at 0.95. Note that the value of dlen(u, v) has been calculated beforehand for every (u, v) at block 406.

Here, the value of sum[q(u, v)] is the sum of the strengths of vertical edges along a line that is a projection of a line on the screen that passes through q(u, v) and is perpendicular to the ground surface. q(u, v) represents a line that passes through q(u, v) and is perpendicular to the ground surface.

Once the process from block 414 through block 420 for all pixels (u, v) has been completed, the value of sum required for calculation DoG and detection of extrema is yielded.

Figure 5:
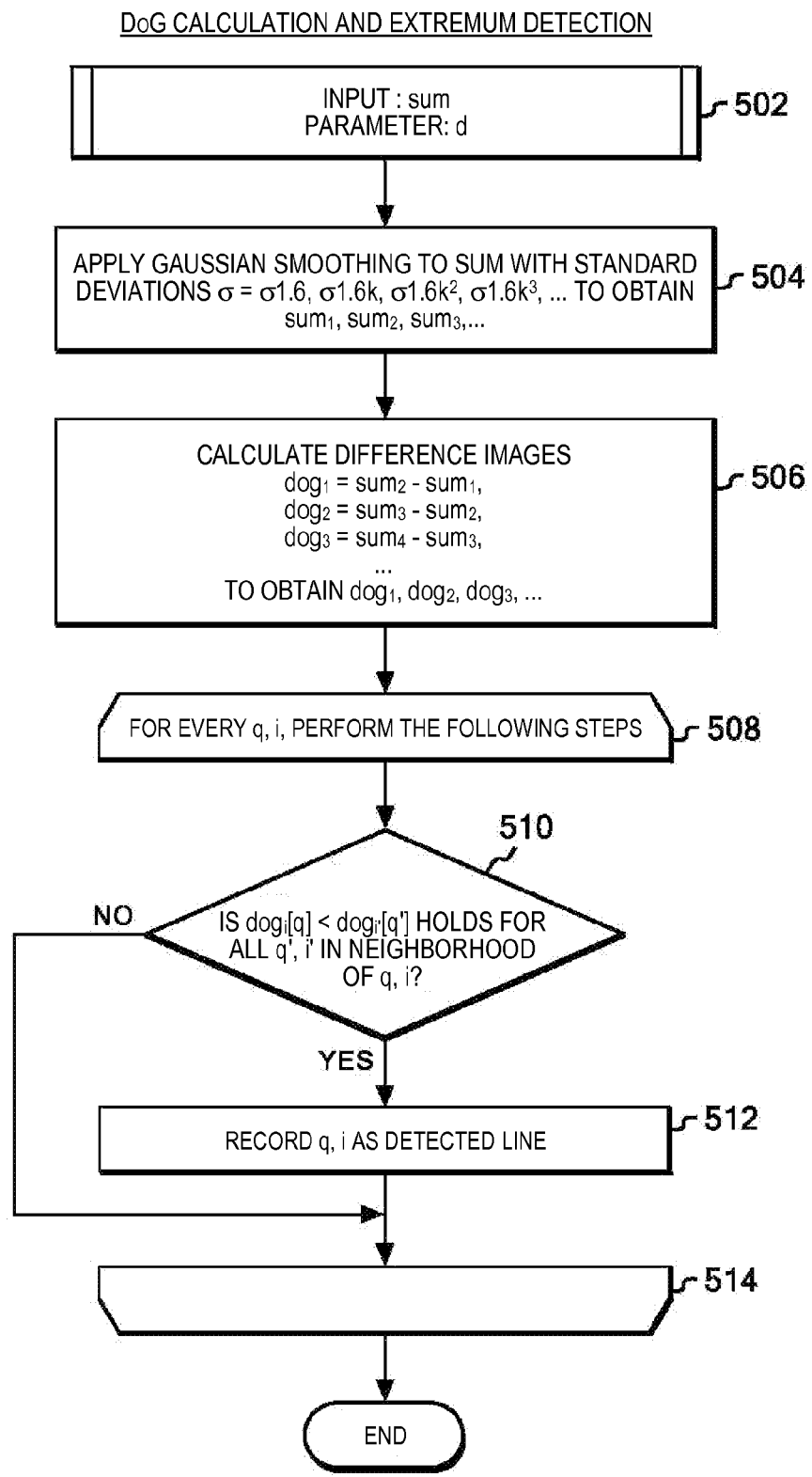
FIG. 5 is a flowchart of a process for computing DoG and detecting extrema.

The process of the DoG calculation and extrema detection routine 308 will be described next with reference to the flowchart of FIG. 5. As illustrated at block 502, the DoG calculation and extrema detection routine 308 is invoked by the main program 302 with the inputs of the sum calculated by the sum calculation routine 306 and a parameter d.

At block 504, the DoG calculation and extrema detection routine 308 applies Gaussian smoothing to the sum with standard deviations σ=σ0, σ0k, σ0k2, σ0k3, . . . to obtain sum1, sum2, sum3, sum4, . . . .

Gaussian smoothing means performing the following convolution of function:

$$G(x, y, \sigma) = \frac{1}{2\pi\sigma^2} \exp\left(-\frac{x^2+y^2}{2\sigma^2}\right) \quad \text{Formula 3}$$

Here k is the number of the standard deviations σ and is set as k=21/s, where s is the number of the scales in scale-space. Here, it is assumed that σ0=1.6 and the number of scales s=3 on the basis of description in, for example, Hironobu Fujiyoshi, "Gradient-Based Feature Extraction: SIFT and HOG", Information Processing Society of Japan Technical Report, CVIM [Computer Vision and Image Media], 2007, (87), 211-224, 2007-09-03.

At block 506, the DoG calculation and extrema detection routine 308 calculates difference images to obtain dog1, dog2, dog3, . . . as follows:

$$dog1 = sum2 - sum1$$
$$dog2 = sum3 - sum2$$
$$dog3 = sum4 - sum3$$
...

The process from block 508 through block 518 is performed for every combination of q and i. At block 510, the Dog calculation and extrema detection routine 308 determines whether or not dogi[q]<dogi'[q']-d for all q', i' in the neighborhood of q, i, that is, whether or not dogi[q] is an extremum. If so, the DoG calculation and extrema detection routine 308 records q, i as a detected line at block 512. Note that q', i' in the neighborhood of q, i are q', i' within q±δ and i±δ. For example, δ=2 is chosen. For the value of d, a condition is set so that the greater the value of d, the sharper extremum is chosen.

When the DoG calculation and extrema detection routine 308 determines at block 510 that dogi[q]<dogi'[q'] holds for all q', i' in the neighborhood of q, i, the DoG calculation and extrema detection routine 308 records q, i as a detected line at block 512.

The process from block 508 through block 514 is performed for every combination of q, i to obtain all combinations of extrema (q, i). Letting σ be the standard deviation used for obtaining the value of the i-th DoG at an extremum (q, i), then (q, σ) is called a keypoint. For dogi=sumi+1−sumi, the standard deviation σ is a standard deviation in Gaussian smoothing of sumi+1 or sumi, for example.

Figure 10:
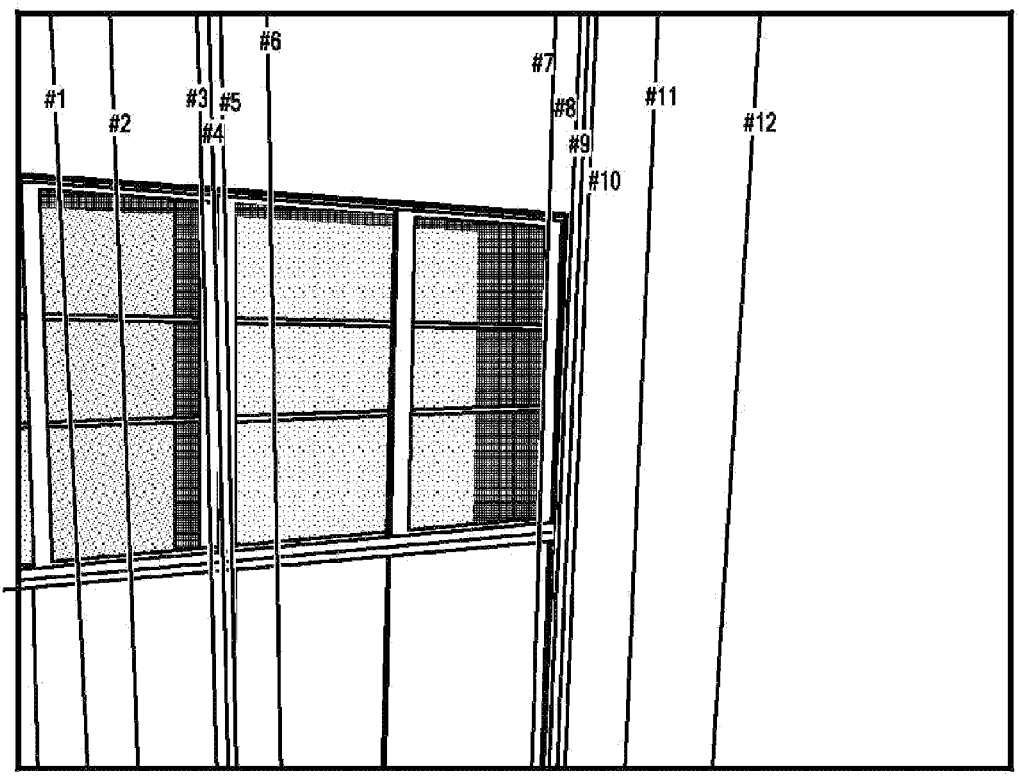
FIG. 10 is a diagram illustrating extracted keypoints in an image.

FIG. 10 illustrates exemplary keypoints extracted in an image.

The process of the feature quantity calculation routine 310 will be described next with reference to the flowchart of FIG. 6. The feature quantity calculation routine 310 is invoked by the main program 302 with the inputs of the values (q, σ) of all key points. The feature quantity calculation routine 310 performs feature extraction based on HoG (Histograms of Oriented Gradients) as described in Hironobu Fujiyoshi, "Gradient-Based Feature Extraction: SIFT and HOG", Information Processing Society of Japan Technical Report, CVIM [Computer Vision and Image Media], 2007, (87), 211-224, 2007-09-03.

Figure 6:
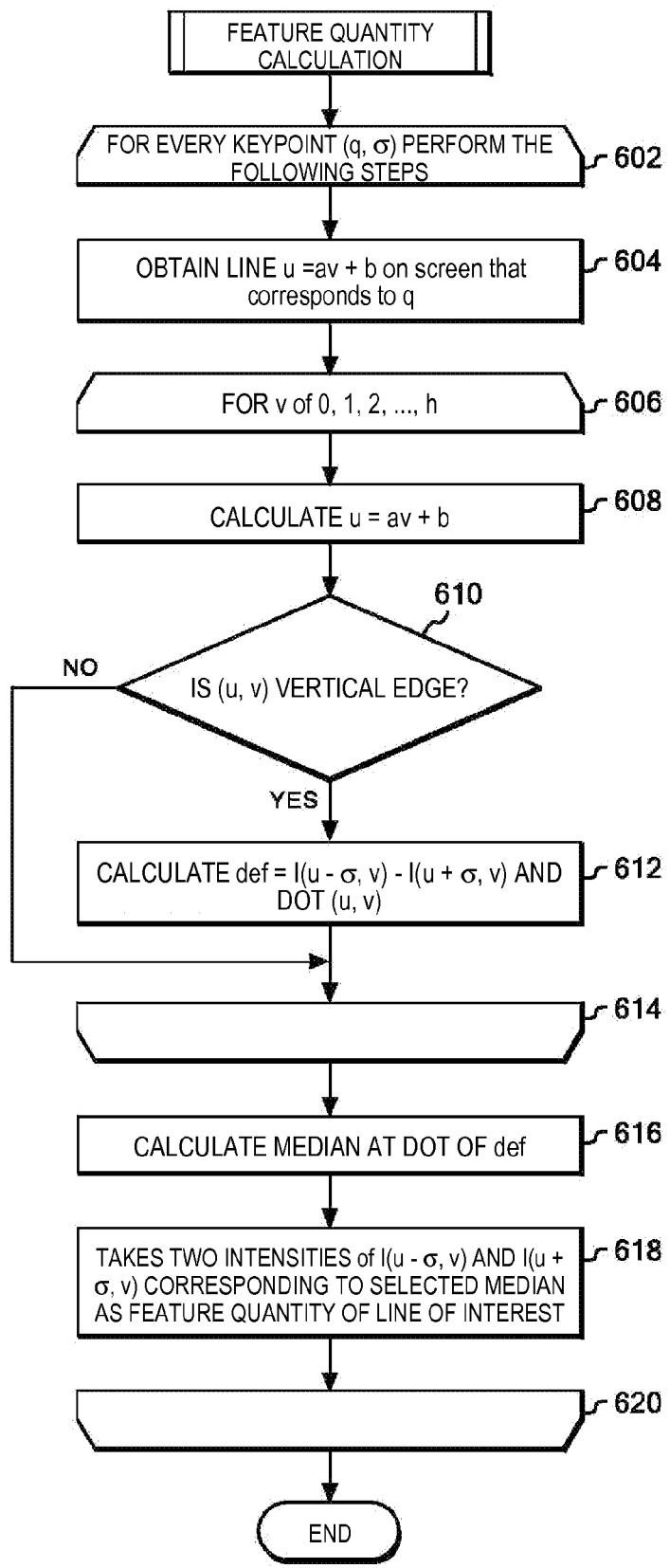
FIG. 6 is a flowchart of a feature quantity calculation process.

The loop from block 602 to block 620 in FIG. 6 is a process for each value (p, σ) of every the keypoint. Here, σ is a standard deviation in Gaussian smoothing of sumi+1 or sumi used in calculation of dogi at an extremum (q, i).

At block 604, the feature quantity calculation routine 310 obtains a line u=av+b on the screen for q according to the following formula:

$$xh=(q-w/2)/f$$

$$yh=-(xg*xh+zg)/yg$$

$$uh=q$$

$$vh=-yh*f+h/2$$

$$a=(uh-u')/(vh-v')$$

$$b=uh-a*vh$$

The loop from block 606 to block 614 is a process for v of each of 0, 1, 2, . . . , h.

The feature quantity calculation routine 310 uses a, b determined at block 604 to calculate u=av+b at block 608.

At block 610, the feature quantity calculation routine 310 determines whether or not (u, v) is a vertical edge. If not, the feature quantity calculation routine 310 skips the next block 612; if so, the feature quantity calculation routine 310 calculates def=I(u−σ, v)−I(u+σ, v) and dot (u, v). Here, dot(u, v) is the inner product of (u'-u, v'-v) and (−dv(u, v), du(u, v)) and σ is the standard deviation in Gaussian smoothing used in calculation of the keypoint.

The loop from block 606 to block 614 for each of v=0, 1, . . . , h is performed in this way to obtain def=I(u−σ, v)−I(u+σ, v) and dot (u, v) for each of v=0, 1, . . . , h. Then the feature quantity calculation routine 310 sorts def in descending order and adds up dot(u, v) corresponding to def. When the accumulated sum of dot exceeds one half of the total sum of dot, the value of def at that point is chosen as the median of def.

At block 618, the feature quantity calculation routine 310 then takes the two intensities of I(u−σ, v) and I(u+σ, v) at (u, v) corresponding to def chosen as the median at block 616 as the feature quantity of the line.

The process from block 602 through block 620 is performed for all keypoints (q, σ) in this way to obtain the feature quantities for all keypoints (q, σ).

The main program 302 uses the feature quantities for the keypoints (q, σ) obtained in this way to search for a line whose feature quantity matches a feature quantity extracted from an existing image. Once matching of lines in the query image and in the existing image has been completed, Bundle Adjustment can be used to estimate the location of the smartphone 108.

While an example in which acceleration data and image data are acquired from a smartphone including an acceleration sensor and the function of camera has been described, the present invention is not limited to smartphones. The present invention can be used with any device that includes the function of measuring acceleration and the function of camera. Furthermore, acceleration may be measured with a gyroscope instead of an acceleration sensor.

Instead of WiFi, any wireless communication technique may be used for transmitting acceleration data and image data to the computer. Wired communication may also be used.

Data acquired from the acceleration sensor and camera of a smartphone are used and then the processes are performed on a separate computer to which the data have been transmitted to extract feature quantities or estimating the location in the exemplary embodiment described above. However, considering the processing power and specifications of recent smartphones, part or all of the processes performed on the separate computer may be performed on the smartphone.

Furthermore, the computer for processing acceleration data and image data is not limited to particular hardware or a particular operating system; any computer with any platform can be used.

The invention claimed is:

1. A feature extraction method for extracting a feature from an image by computer processing, the method comprising:
   receiving an image and measured acceleration data from a mobile device including image acquiring means and acceleration measuring means;
   obtaining a gravity vector in the image in a camera coordinate system on a basis of the measured acceleration data;
   obtaining a vanishing point in the image in a vertical direction in a screen coordinate system by using the gravity vector;
   obtaining differential vectors along two axes for each of pixels in the screen coordinate system;
   obtaining a connection line vector connecting each of the pixels with the vanishing point;
   identifying a vertical edge on the basis of determination that an angle formed by the differential vector and the connection line vector is within a certain threshold range;
   obtaining the sum of strengths of vertical edges and writing the sum in a predetermined variable array;
   extracting a keypoint on the basis of the variable array; and
   calculating a feature quantity from the keypoint.

2. The method according to claim 1, wherein the acceleration measuring means is an acceleration sensor.

3. The method according to claim 1, wherein obtaining the sum of strengths of vertical edges and writing the sum in a predetermined variable array comprises calculating the absolute value of the inner product of the differential vector and (u'-u, v'-v) and writing the absolute value in the variable array, where (u, v) is screen coordinates and (u', v') is the vanishing point.

4. The method according to claim 1, wherein extracting a keypoint comprises assuming the variable array to be a horizontally long image and calculating an extremum by using a DoG (difference of Gaussian) function.

5. The method according to claim 1, wherein the mobile device is a smartphone.

6. The method according to claim 1, wherein calculating a feature quantity comprises calculating HoG (Histograms of Oriented Gradients).

7. The method according to claim 1, wherein some or all of the steps are performed by the mobile device.

8. A computer program product comprising a non-transitory computer readable storage medium having computer readable instructions stored thereon that, when executed by a computer, implement a feature extraction method for extracting a feature from an image by computer processing, the method comprising:
   receiving an image and measured acceleration data from a mobile device including image acquiring means and acceleration measuring means;
   obtaining a gravity vector in the image in a camera coordinate system on the basis of the measured acceleration data;
   obtaining a vanishing point in the image in a vertical direction in a screen coordinate system by using the gravity vector;
   obtaining differential vectors along two axes for each of pixels in the screen coordinate system;
   obtaining a connection line vector connecting each of the pixels with the vanishing point;
   identifying a vertical edge on the basis of determination that an angle formed by the differential vector and the connection line vector is within a certain threshold range;
   obtaining the sum of strengths of vertical edges and writing the sum in a predetermined variable array;
   extracting a keypoint on the basis of the variable array; and
   calculating a feature quantity from the keypoint.

9. The computer program product according to claim 8, wherein the mobile device is a smartphone.

10. The computer program product according to claim 9, wherein the acceleration measuring means is an acceleration sensor.

11. The computer program product according to claim 8, wherein obtaining the sum of strengths of vertical edges and writing the sum in a predetermined variable array comprises calculating the absolute value of the inner product of the differential vector and (u'-u, v'-v) and writing the absolute value in the variable array, where (u, v) is screen coordinates and (u', v') is the vanishing point.

12. The computer program product according to claim 8, wherein extracting a keypoint comprises assuming the variable array to be a horizontally long image and calculating an extremum by using a DoG (difference of Gaussian) function.

13. The computer program product according to claim 8, wherein calculating a feature quantity comprises calculating HoG (Histograms of Oriented Gradients).

14. The computer program product according to claim 8, wherein some or all of the steps are performed by the mobile device.

* * * * *